United States Patent
Whittier et al.

(10) Patent No.: US 10,510,046 B2
(45) Date of Patent: Dec. 17, 2019

(54) PROACTIVE MATCHING FOR COORDINATION OF BENEFITS

(71) Applicant: Passport Health Communications, Inc., Franklin, TN (US)

(72) Inventors: Dustin Ryan Whittier, Nashville, TN (US); Richard W. Farmer, Nashville, TN (US)

(73) Assignee: PASSPORT HEALTH COMMUNICATIONS, INC., Franklin, TN (US)

( * ) Notice: Subject to any disclaimer, the term of this patent is extended or adjusted under 35 U.S.C. 154(b) by 0 days.

(21) Appl. No.: 13/852,695

(22) Filed: Mar. 28, 2013

(65) Prior Publication Data

US 2013/0262154 A1    Oct. 3, 2013

Related U.S. Application Data

(60) Provisional application No. 61/616,593, filed on Mar. 28, 2012.

(51) Int. Cl.
*G06Q 10/10* (2012.01)
*G06Q 40/08* (2012.01)

(52) U.S. Cl.
CPC ......... *G06Q 10/1057* (2013.01); *G06Q 40/08* (2013.01)

(58) Field of Classification Search
CPC .... G06Q 10/1057; G06Q 40/00; G06Q 40/02; G06Q 40/08; G06Q 50/22; G06Q 50/24

(Continued)

(56) References Cited

U.S. PATENT DOCUMENTS 5,832,447 A * 11/1998 Rieker ................. G06F 19/328
                                                      705/2
8,260,634 B1 * 9/2012 Lawlor ................. G06Q 50/18
                                                      705/2

(Continued)

OTHER PUBLICATIONS

Eleni Kastrenakes, Lyndall M.Lambert, Steven Raffaele, The Medicare, Medicaid, and SCHIP Extension Act of 2007: Medicare Gets Serious About Reimbursement in Personal Injury Liability Claims, May 17, 2010, Mondaq, Ltd. Business Briefing, Copyright 2010 Mondaq Ltd., 6 pages. (Year: 2010).*

*Primary Examiner* — Benjamin S Brindley
(74) *Attorney, Agent, or Firm* — Merchant & Gould (57) ABSTRACT

Proactive resolution of coordination of benefits (COB) issues is provided. Payer data is received as membership files from a plurality of payers, the payer data including eligibility and member demographic data. Upon detection of new or modified information, a normalizing engine may be utilized to normalize name information, address information, and social security number information into a format for comparing with other stored payer data according to various rules. A matching engine may be utilized to compare the normalized payer data against other insurance provider data to determine COB instances by discovering matches or partial-matches of member information. A set of rules may be applied to determine a primary versus a secondary payer. An output file, which may comprise matches and COB determinations, raw data, and a web interface for accessing archived reports and files and to generate individual member searches, may be provided to one or more payers.

20 Claims, 3 Drawing Sheets

(58) Field of Classification Search
USPC .............................................................. 705/4
See application file for complete search history.

(56) References Cited

U.S. PATENT DOCUMENTS

| | | | | |
|---|---|---|---|---|
| 8,321,243 | B1* | 11/2012 | Harris, Sr. | G06Q 10/10 |
| | | | | 705/3 |
| 8,489,415 | B1* | 7/2013 | Ringold | G06Q 10/10 |
| | | | | 705/2 |
| 2008/0010096 | A1* | 1/2008 | Patterson | G06F 19/328 |
| | | | | 705/4 |
| 2009/0164243 | A1* | 6/2009 | Zubak | G06F 19/328 |
| | | | | 705/2 |
| 2009/0254572 | A1* | 10/2009 | Redlich | G06Q 10/06 |
| 2010/0131299 | A1* | 5/2010 | Hasan | G06F 19/324 |
| | | | | 705/3 |
| 2010/0145732 | A1* | 6/2010 | Korpman | G06F 19/324 |
| | | | | 705/3 |
| 2010/0223172 | A1* | 9/2010 | Donnelly | G06F 19/328 |
| | | | | 705/34 |
| 2011/0238488 | A1* | 9/2011 | Hahn | G06F 17/30528 |
| | | | | 705/14.42 |
| 2011/0246229 | A1* | 10/2011 | Pacha | G06F 19/328 |
| | | | | 705/2 |
| 2012/0035952 | A1* | 2/2012 | Coyne | G06Q 40/08 |
| | | | | 705/2 |
| 2013/0232006 | A1* | 9/2013 | Holcomb | G06F 16/951 |
| | | | | 705/14.54 |
| 2014/0297304 | A1* | 10/2014 | Nguyen | G06Q 20/10 |
| | | | | 705/2 |

* cited by examiner

PROACTIVE MATCHING FOR COORDINATION OF BENEFITS

CROSS-REFERENCE TO RELATED APPLICATIONS

The present application claims priority to U.S. Provisional Patent Application No. 61/616,593 titled "Proactive Matching for Coordination of Benefits" filed Mar. 28, 2012, the disclosure of which is incorporated herein by reference in its entirety.

BACKGROUND

Coordination of benefits (COB) is a method used to determine which insurance company (i.e., payer) is primarily responsible for payment when an individual is covered under more than one insurance plan. COB may also be used to help ensure that an insurance claim is not paid multiple times, for example, by multiple payers, when an individual is insured under multiple insurance plans. In healthcare, individuals may be covered by multiple insurance plans, for example, when two partners both receive healthcare benefits through their jobs, and their benefits are expanded to their spouses or domestic partners, and to their children if dependents are automatically covered. As a result, each partner (and children if applicable) may be covered by two health insurance plans.

Oftentimes, there may be guidelines that regulate how claims are processed relative to multiple coverages. For example, if a married couple is covered by two health insurance plans, the husband's insurance plan may be primary coverage for him, while his spouse's insurance plan may be primary coverage for her. However, if one person has insurance coverage through a government-subsidized payer (e.g., Medicaid or Veterans Affairs (VA)) and the spouse has insurance coverage through an employer, then the spouse's insurance coverage through the employer may be primary coverage for both. As another example, typically, if a child is covered by both parents' health insurance plans, a "birthday rule" may be user, wherein the health insurance provider (i.e., payer) of the parent whose birthday falls first in a calendar year may be determined to be the primary health insurance provider of the child. As can be appreciated, there may be exceptions to the "birthday rule," as well as other rules for determining primary coverage.

Currently, if an individual receives a healthcare service from a healthcare service provider, and the individual has multiple coverages (i.e., is covered under more than one health insurance plan), the healthcare provider may not know which health insurance plan carrier (i.e., payer) is primary or secondary and to which payer a claim should be filed. Consider, for example, a child who is covered under two different healthcare insurance policies is injured and goes to a hospital for treatment. One policy may be under his mother and the other one may be under his father. Even if both parents are present and they both have their insurance cards, the hospital may not know to which insurance company to submit the claim. In many cases, the healthcare provider may submit a claim to both payers. Most of the time, one of the insurance companies (i.e., payers) may pay. In some instances both the insurance companies may pay, which can lead to wasted administrative and accounting work and costs. For example, one payer may later determine they are secondary and may request to be reimbursed for the payment made. In other cases, neither payer may pay, both denying the claims until they receive a document that says the individual does not have a COB instance (i.e., the individual does not have multiple health insurance coverages).

Current COB methods may cause administration challenges that can add cost and increased workloads to departments within an insurer's operation. For example, current COB methods may cause service workarounds, claim delays, rework, phone calls, recovery fees, and administrative costs in a search for which individuals may have duplicate coverage and for which payer may be primary and which payer may be secondary. It is with respect to these and other considerations that the present invention has been made.

SUMMARY

Embodiments of the present invention provide for proactively resolving coordination of benefits (COB) issues by maintaining a database of membership data, utilizing stored data for determining matches, determining primacy, and providing output to insurance providers. Embodiments may be utilized to help eliminate wasted administrative costs, avoid claim overpayment risks, and reduce hassles and costs for providers and members.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Embodiments provide a central repository for proactively resolving coordination of benefits (COB) issues. Embodiments may be utilized to help eliminate wasted administrative costs, avoid claim overpayment risks, and reduce hassles and costs for providers and members. Embodiments provide for receiving payer data from a plurality of payers, identifying COB instances via a data matching service, applying a set of rules for determining a primary versus a secondary payer, and providing output which may comprise matches and COB determination, raw data, and a web interface for accessing archived reports and files, and to generate individual member searches.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

As described above, COB is a method utilized to ensure that an insurance claim is not paid multiple times when an individual is covered under multiple insurance plans. There may be various situations in which an individual may be covered by multiple insurers (e.g., working spouses, both with insurance; divorced couples with historic shared coverage; employees with Medicare and corporate insurance, etc.). For example, spouses may each receive healthcare benefits through their jobs and their healthcare benefits may be expanded to also cover the spouse, resulting in each partner being covered by two health insurance plans. Additionally, this may extend to children having multiple coverages. Under COB, one payer may be designated as the primary payer, and the other payer may be designated as the secondary payer. If a primary payer refuses to pay a claim or does not pay a claim in full, the claim may be passed to the secondary payer to pay.

Currently, insurance payers may use various methods to control their costs of COB. One method is a pay and chase philosophy. For example, a claim may be received, and the payer may pay the claim without performing a COB. This may benefit the healthcare provider receiving the payment because the healthcare provider is receiving cash-flow; however, the payer may later determine they should not have paid for a particular claim and may come back to the healthcare provider for reimbursement. This may be referred to as a pay and chase mechanism. In a situation where a healthcare provider submits a claim to two payers and both payers pays the claim, one of the payers may come back requesting a reimbursement.

Another method that insurance payers use may be to refuse payment if they think there may be a COB instance if they do not have a record on an individual, for example, a file document that says there is not a COB instance. Consequently, a healthcare provider may receive a denial to the claim and may have to figure out why the claim was denied. If the healthcare provider discovers that it is a legitimate denial, for example, that payer A really is not primary and should not pay first, the healthcare provider may then have to submit a claim to payer B, and resubmit a new claim to payer A, which may include the amount not covered by payer B. As can be appreciated, this can be a very complicated process.

Figure 1:
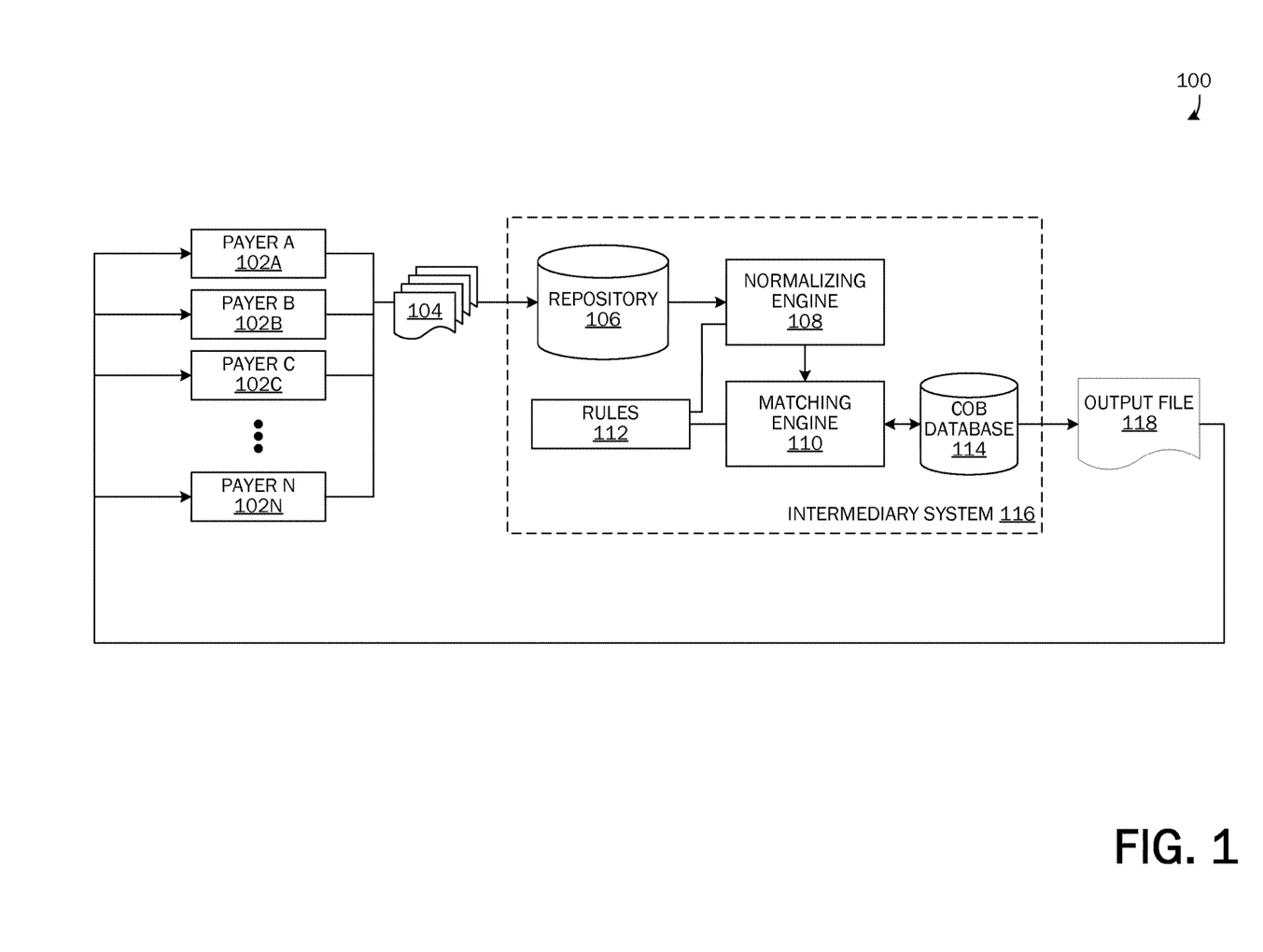
FIG. 1 is a simplified block diagram of a high-level system architecture with which embodiments of the invention may be implemented.

Embodiments provide for a proactive matching for COB. Referring now to FIG. 1, a simplified block diagram of a high-level system architecture with which embodiments of the invention may be implemented 100 is shown. As illustrated, payer data 104 may be received from a plurality of healthcare insurance payers 102. Payer data 104 may be pushed to an intermediary system 116 by one or more payers 102, pulled by the intermediary system 116, and may be received in real time or according to a predetermined frequency (e.g., weekly, monthly, quarterly, etc.). The payer data 104 may be a membership file which may include eligibility and member demographic data such information as, but is not limited to, a member's name, phone number(s), social security number, driver license number, birth date, gender, address, member identification number, plan name, plan type, insured's name, dates of coverage, marital status, employment status, policy holder's information, custodial parent information, etc. According to embodiments, when payer data 104 is received, the data may be analyzed and loaded into a repository 106.

The system 100 may include an intermediary system 116, which may act as a data aggregator of membership data from one or more payers 102. The intermediary system 116 is illustrative of a business or other entity that may include a collection of computers, storage media, or other computing devices operative to receive and normalize payer data 104 and to compare and match the data for a proactive coordination of benefits process.

According to embodiments, the intermediary system 116 may comprise a normalizing engine 108 operable to perform normalization of payer data 104. According to embodiments, normalization may be performed to help improve matching (as will be described below) without undermining integrity of results. Various rules 112 may be utilized by the normalizing engine 108 to normalize name information, address information, social security numbers, etc. into a format that may increase the likelihood of discovering matching information from various payer data 104. According to embodiments, normalization may include normalizing name information, for example, normalizing an inconsistent use of punctuation and spaces in names and the inclusion of suffixes (JR, SR, III) in a last name field. Normalization may include a removal of punctuation characters from names, including spaces (e.g., O'NEAL to ONEAL and SMITH-JONES or SMITH JONES to SMITHJONES). The normalization process may include removal of suffixes (e.g., JR, SR, II, III and IV) from last names when they are the last characters in the last name and preceded by a space. Normalization of name information may include applying a synonym table to names (e.g., Bill/Will/Billy/William, Joe/Joey/Joseph, etc.).

According to embodiments, data normalization may include address normalization. City name normalization may include spelling variations, abbreviation differences (e.g., "ST MTN" verses "STONE MOUNTAIN"), and punctuation differences (e.g., "FT. VALLEY" verses "FT VALLEY"). A first line of a street address may be normalized by removing spaces and punctuation and reducing directional words such as "East" or "Southwest" to abbreviations. More consistent results may be obtained with using directional abbreviations rather than expanding abbreviations to whole words because of possible uncertainty in interpreting directional abbreviates. For example, the "E" in "123 Main St, E 2" could be an apartment number or some other subdivisional unit rather than an abbreviation for east.

According to embodiments, data normalization may include social security number normalization. Normalizing social security numbers (SSN) may comprise an elimination of patterns of characters such as "999999999" and "123121234". Normalization of SSN may also comprise a removal of duplicate SSN numbers among family members. For example, if a policy holder and a dependent share the same SSN value, the SSN may be removed from the dependent.

According to embodiments, a comparison may be made of payer data 104 stored in the repository 106 to determine if any information associated with a member may be new, modified, or previously unmatched. Data that is determined to be new, modified, or previously unmatched may be sent to a matching engine 110 operable to compare payer data 104 against other insurance provider files (i.e., received payer data 104) to discover if an individual may be covered under more than one health insurance policy, for example, by determining COB instances by discovering matches or partial-matches of member information (i.e., payer data 104).

Matching payer data 104 may be determined according to various rules 112. According to an embodiment, an address match may include a match of a predetermined number of characters of a normalized street address and a match of either a city name or zip code. For example, an address match may be determined if the first 10 characters of the normalized first street address match and either the city name or the 5 character zip code matched.

According to an embodiment, a SSN match may include a partial match of a predetermined number of digits of the SSN. For example, a match may be determined if eight of the nine digits in a SSN match. According to one embodiment, a partial SSN match may include a detection of transposed numbers.

Confidence levels may be given to various combinations of matches or partial matches of data. For example, according to one embodiment, an SSN in combination with name, date of birth and other fields may provide reliable matching results. For example, the probability of a mismatch may be limited to a narrow combination of a mistyped SSN for two individuals along with identical supporting information.

According to one embodiment, variations of matching an SSN and date of birth with a name may be utilized in the matching process. For example, the matching process may include comparing a complete normalized first and last name. A comparison using a partial match of a last name (e.g., first six characters) and a complete first name may be applied to find variations in last name spelling and to detect situations where one payer may include a hyphenated last name. A synonym first name with a full last name may be applied to march variations (e.g., Bill/William and Judy/Judith). A partial first name (e.g., first six characters) in conjunction with a full last name may be matched to detect variations in name spelling and inclusion of middle names in the first name field.

Sometimes, SSNs may not be available. In such cases, other mechanisms may be utilized. For example, the process may include matching normalized names and addresses in conjunction with a date of birth. A combination of exact name matches after name normalization along with partial matches using a predetermined number of characters of the normalized last name and first name. These matches may be supplemented with partial SSN matches.

According to another embodiment, additional match rules may be applied (e.g., SSN and last name match; SSN and first name match; phone, DOB, and gender match, etc.). An SSN and last name match may be utilized to detect a match when a first name is misspelled or contains a middle name. Since duplicate SSNs within a same family may be removed as part of the normalization process, a family member with a unique SSN and the same last name may make a good match regardless of the first name.

An SSN and first name match may be utilized to detect married women whose last names have changed. This may also be utilized to detect misspelled last names. A phone, date of birth, and gender match may be utilized to detect matches that may not have been identified elsewhere.

Below is a table of example rules 112 that may be utilized as match logic by the matching engine 110 according to an embodiment. As can be appreciated, various combinations of match logic may be utilized in a matching process.

| | |
|---|---|
| Name match | The normalized first and last names must match exactly |
| Name match (partial last) | The normalized first name must match exactly and the first 6 characters of the normalized last name must match |
| Name match (partial first) | The normalized last name must match exactly and the first 3 characters of the normalized first name must match |
| Name match (equivalent first) | The normalized last name must match exactly and the normalized first name must match through a limited first name synonym table (Bill/Billy/William, Joe/Joey/Joseph, etc.) |
| Addresses match | The normalized street address has to match exactly and either the city name or zip code must match exactly |
| DOB | All 8 digits of the date of birth (xx/xx/xx) must match perfectly and in exactly the same order (no transpositions) |
| DOB seven digits | Seven of the eight digits in the date of birth must match perfectly. All seven digits have to be in exactly the same relative position in the DOB, e.g., the digits for the month and day cannot be transposed |
| SSN | All 9 digits of the SSN must match perfectly and must be in exactly the same order (no transpositions) |
| SSN 8 digits | Eight of the nine digits in the SSN must match perfectly. All 8 matching digits have to be in exactly the same relative position with the SSN number, e.g., the $4^{th}$ digit in one SSN has to match the $4^{th}$ digit in the other SSN, etc. |

Once the matching methodology has been exhausted and all possible matches are identified, the matching engine 110 may be operable to determine an assignment of primary and secondary responsibility. According to an embodiment, a process of determination of primacy may be based on National Association of Insurance Commissioners (NAIC) and state guidelines as well as available data from a payer 102 that may provide any exceptions to NAIC and state guidelines (e.g., divorce decree, child custody agreement, etc.). Embodiments may include an identification of a plan type (e.g., medical, dental, life, student, Cobra, etc.) from each payer 102. This identification may be utilized for creating a definitive primacy determination and for providing qualified instances of COB.

After the matching process is complete and primacy determinations are made, matches and primacy determinations may be stored in a COB database 114. Output files 118 may be generated for each payer 102. The database 114 may be a central repository and include all payers 102 and all matches. According to an embodiment, the matching process and subsequent output 118 may be in a real-time format. An output file 118 may include a summary report, raw data, and ad hoc queries. The summary report may provide an overview of the payer data 104 received, as well as a summary of the matches and COB determinations. The raw data may be in the format of a file for each payer 102 to import into their internal system for processing and review. The ad hoc query may be a web interface operative to access archived reports and files and to generate individual member searches as needed. Payers 102 may utilize the output 118 to update their databases to utilize for processing future claims.

Embodiments may be utilized for determining insurance coverage and eliminate the need for providers to search multiple disparate databases to select a correct payer for healthcare services. Embodiments may be utilized to update COB information before a claim is submitted, which may maximize claim auto-adjudication and provider portal functionality.

Figure 2:
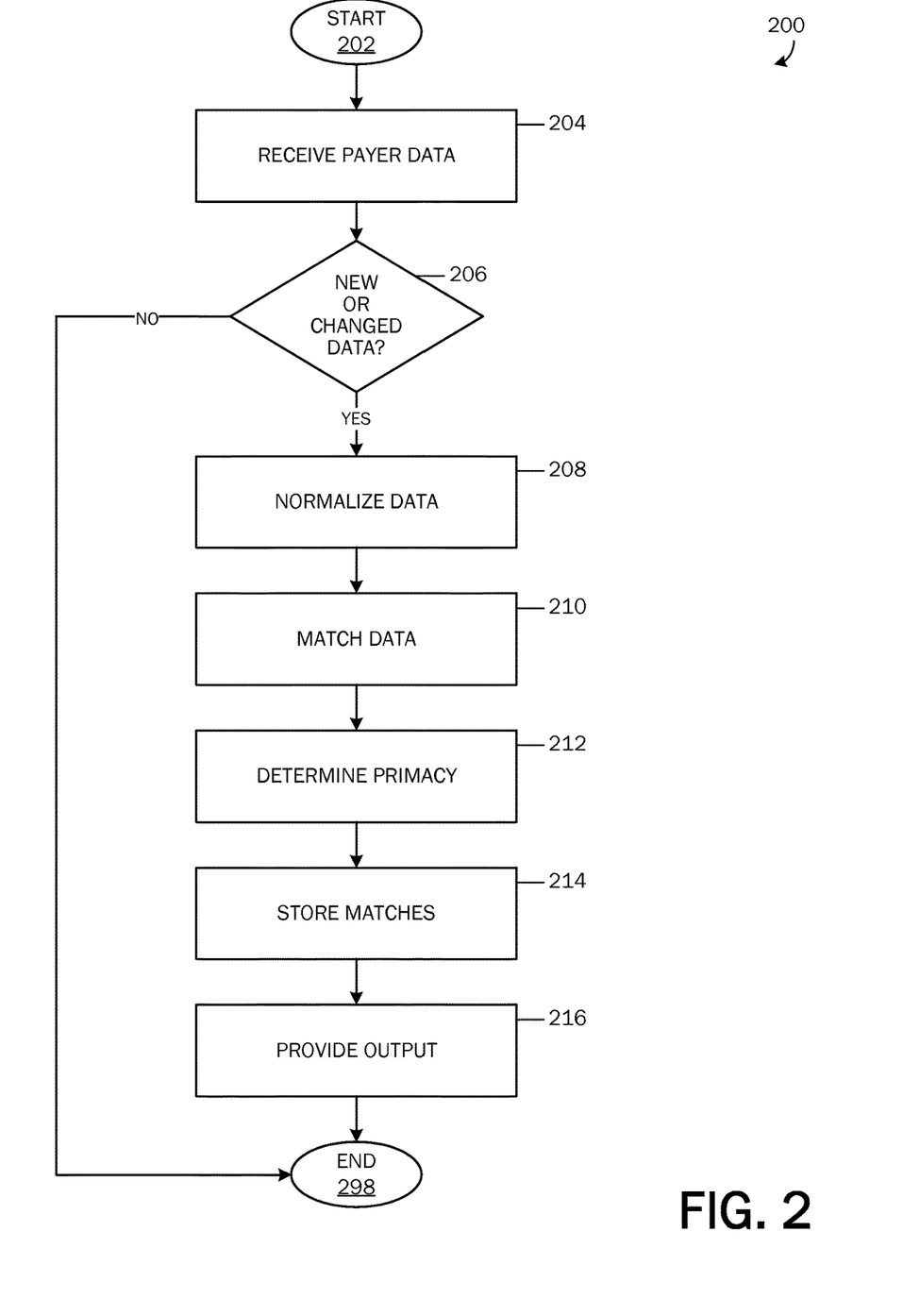
FIG. 2 is a flow chart of a method of providing proactive matching for coordination of benefits according to an embodiment.

Having described a high-level system architecture with which embodiments of the invention may be implemented, FIG. 2 is a flow chart of a method of providing an identification of COB instances via a normalization and data matching process, applying a set of rules for determining primacy, and providing output. Referring now to FIG. 2, the method 200 begins at START OPERATION 202, and proceeds to OPERATION 204 where payer data 104 is received from a plurality of payers 102. As described above payer data 104 may be a membership file which may include eligibility and member demographic data such information as, but not limited to, a member's name, phone number(s), social security number, driver license number, birth date, gender, address, member identification number, plan name, plan type, insured's name, dates of coverage, marital status, employment status, policy holder's information, custodial parent information, etc.

When payer data 104 is received the method 200 proceeds to DECISION OPERATION 206, where the data 104 may be analyzed and a determination may be made as to whether there is any new or modified information. For example, new or modified information may include new member data, a change of a member's name, address, phone number, employment status, marital status, etc.

If new or changed payer data 104 is found, the new or changed data 104 may be stored in a repository 106, and the method 200 may proceed to OPERATION 208 where the new or modified payer data 104 may be normalized into a format for comparing with other stored payer data 104. As described above, name information, address information, social security numbers, date-of-birth information, etc. may be normalized according to various rules 112. For example, normalizing name information may include normalizing an inconsistent use of punctuation and spaces in names and the inclusion of suffixes (JR, SR, III) in a last name field, a removal of punctuation characters from names, a removal of suffixes (e.g., JR, SR, II, III and IV) from last names when they are the last characters in the last name and preceded by a space, or applying a synonym table to names (e.g., Bill/Will/Billy/William, Joe/Joey/Joseph, etc.).

After the payer data 104 has been normalized, the method 200 may proceed to OPERATION 210, where the normalized payer data 104 may be compared with payer data 104 received from other payers 102 to find possible matches. Matching data found from different payers 102 may be indicative of an individual being covered under multiple healthcare insurance policies. As described above, various rules 112 may be applied for determining matching payer data 104.

When all rules 112 have been applied and all possible matches have been identified, the method 200 may proceed to OPERATION 212, where primacy may be determined. Determining which payer 102 may be primary and which payer 102 may be secondary may be determined according to NAIC regulations and state guidelines. For example, a child whose parents are married, the plan of the parent whose birthday falls earlier in the calendar year may be determined as the primary plan. Other available data from a payer 102 that may provide any exceptions to NAIC regulations and state guidelines may be used for determining primacy. For example, other data provided by the payer 102 may include information of a court decree stating that one parent's plan is the primary plan. Discovered matches may be stored in the COB database 114 at OPERATION 214.

After the matching process is complete and primacy determinations have been made, the method 200 proceeds to OPERATION 216, where output files 118 may be generated for each payer 102. The output files 118 may include a summary report and raw data that may be provided in a format able to be imported into the payer's 102 internal system for processing and review. The output files 118 may also include ad hoc queries, which may include a web interface for access to archived reports and files for providing individual member search functionalities. As can be appreciated, payers 102 may be able to utilize the output 118 to clean up and update COB information before a claim is filed, and thereby maximizing claim auto-adjudication. The method ends at operation 298.

Figure 3:
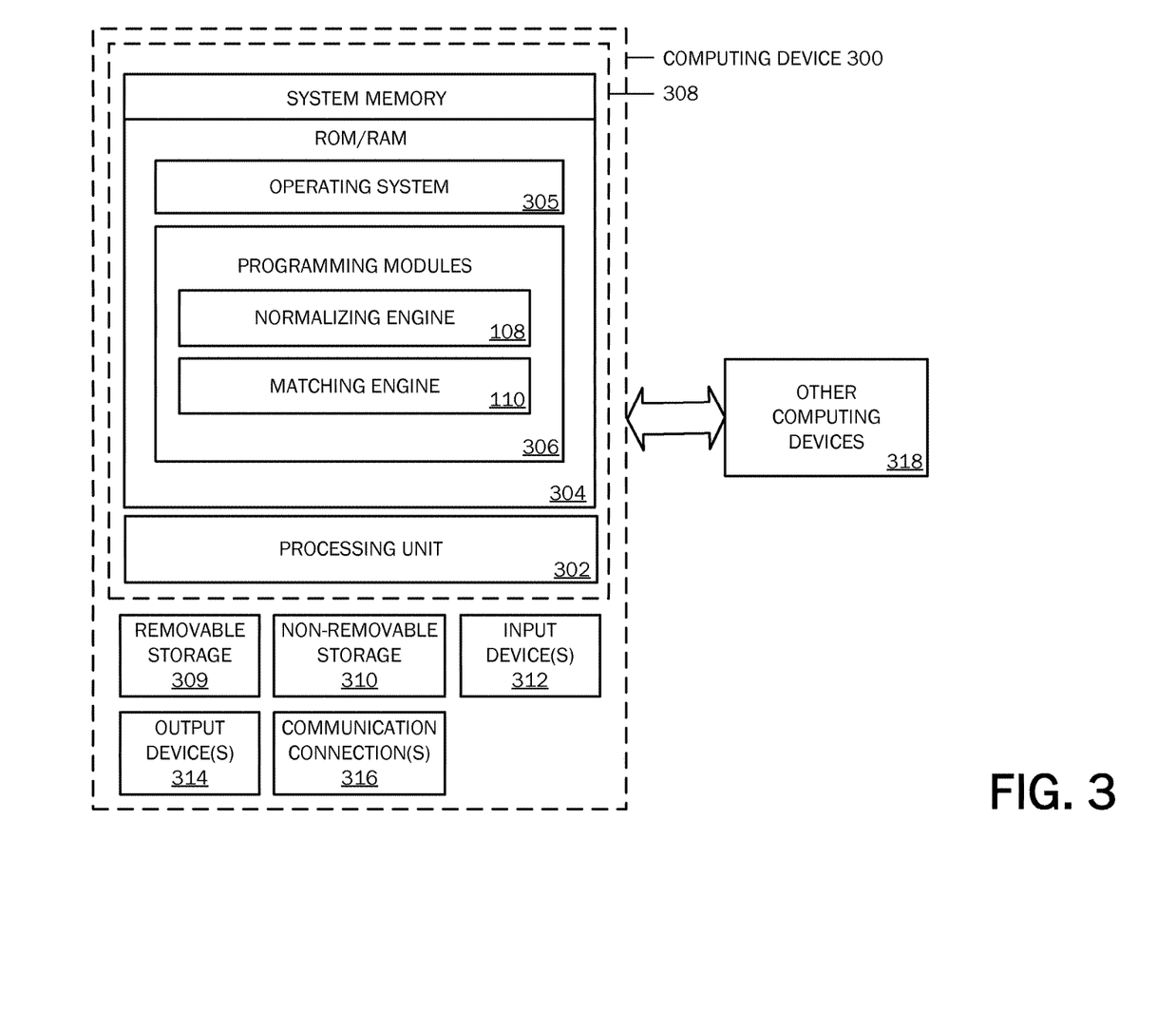
FIG. 3 is a simplified block diagram of a computing device with which embodiments of the present invention may be practiced.

With reference to FIG. 3, a system consistent with embodiments of the invention may include one or more computing devices, such as computing device 300. The computing device 300 may include at least one processing unit 302 and a system memory 304. The system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a normalizing engine 108 and a matching engine 110, wherein the normalizing engine 108 and the matching engine 110 are software applications having sufficient computer-executable instructions, which when executed, perform functionalities as described herein. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

The computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media. Data may be input and output to/from the device 300 via one or more input devices 312 and/or output devices 314.

Program modules, such as the normalizing engine 108 and the matching engine 110, may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable user electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

Embodiments of the present invention, for example, are described above with reference to block diagrams and/or operational illustrations of methods, systems, and computer program products according to embodiments of the invention. For example, FIGS. 1-3 and the described functions taking place with respect to each illustration may be considered steps in a process routine performed by one or more local or distributed computing systems. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

All rights including copyrights in the code included herein are vested in and the property of the Applicant. The Applicant retains and reserves all rights in the code included herein, and grants permission to reproduce the material only in connection with reproduction of the granted patent and for no other purpose.

We claim:

1. A method of using an intermediary computing device having one or more computer hardware components to aggregate membership data from one or more payers and apply a plurality of specific rules to proactively discover and resolve coordination of benefits (COB) instances to eliminate searches of multiple disparate databases and control claim resubmissions and inappropriate claim submissions, the method comprising:

using the one or more computer hardware components of the intermediary computing device as part of receiving payer data comprising at least one membership file in real time via a computer network, the membership file including eligibility and demographic data;

using the one or more computer hardware components of the intermediary computing device as part of normalizing the received payer data into a format that increases a likelihood of discovering matching information according to the received payer data;

using the one or more computer hardware components of the intermediary computing device as part of comparing the normalized payer data with payer data received from one or more other payers to determine if any information is previously unmatched according to the plurality of specific rules;

using the one or more computer hardware components of the intermediary computing device to apply the plurality of specific rules as part of discovering matching or partially-matching payer data to automatically resolve COB instances when an individual is covered under multiple healthcare insurance coverages, wherein the discovering the matching or partially-matching payer data includes applying, by the intermediary computing device, the plurality of specific rules that include:

a first rule for a name match requiring normalized first and last names to match exactly;

a second rule for a partial last name match requiring a normalized first name to match exactly and matching of a first number of characters of a normalized last name;

a third rule for a partial first name match requiring a normalized last name to match exactly and matching of a first number of characters of a normalized first name;

a fourth rule for an equivalent first name match requiring a normalized last name to match exactly and matching of a normalized first name according to a first name synonym table that includes matching of a synonym first name associated with the normalized first name;

a fifth rule for an address match requiring a normalized street address to match exactly and matching of either a city name or a zip code;

a sixth rule for a first date of birth match requiring a first number of digits of a date of birth to match in the same relative position;

a seventh rule for a first social security number match requiring a first number of digits of the social security number to match in the same relative position;

an eighth rule for a second date of birth match requiring all digits of the date of birth to match in exactly the same order along with matching a phone number and a gender; and a ninth rule for a second social security number match requiring all digits of the social security number to match in exactly the same order along with matching one or more of a last name and a first name;

after applying the plurality of specific rules, using the one or more computer hardware components of the intermediary computing device to determine a primary payer and a secondary payer comprising determining primacy based on National Association of Insurance Commissioners (NAIC) and state guidelines corresponding with the discovered matching or partially matching payer data absent requiring searching the multiple disparate databases to select a correct payer; and using the one or more computer hardware components of the intermediary computing device as part of storing the matching or partially-matching payer data and primacy determinations in a COB database.

2. The method of claim 1, wherein normalizing the received payer data comprises determining if the received payer data includes any new, modified, or previously unmatched payer data and normalizing the any new, modified, or previously unmatched payer data.

3. The method of claim 1, further comprising one or more of:

normalizing name information;
normalizing address information; and
normalizing social security numbers.

4. The method of claim 3, wherein normalizing name information comprises normalizing an inconsistent use of punctuation and spaces in names and the inclusion of suffixes in a last name field.

5. The method of claim 3, wherein normalizing name information comprises a removal of punctuation characters and spaces from names.

6. The method of claim 3, wherein normalizing name information comprises a removal of suffixes from last names when the suffixes are the last characters in the last name and preceded by a space.

7. The method of claim 3, wherein normalizing name information comprises applying a synonym table to names.

8. The method of claim 3, wherein normalizing address information comprises normalization of spelling variations, abbreviation differences, and punctuation differences.

9. The method of claim 3, wherein normalizing address information comprises removing spaces and punctuation from a first line of a street address and reducing directional words to abbreviations.

10. The method of claim 3, wherein normalizing social security numbers comprises eliminating patterns of characters.

11. The method of claim 3, wherein when a same social security number is associated with multiple family members in the received payer data, normalizing social security numbers comprises removing a duplicate social security number from at least one family member.

12. The method of claim 1, further comprising receiving data from a payer that provides an exception to the National Association of Insurance Commissioners (NAIC) and state guidelines and determining primacy based on the received data.

13. The method of claim 1, further comprising generating an output file that includes:

an overview of the received payer data;
a summary of rule matches for the plurality of rules and COB determinations;
and/or raw data for importing into a payer system.

14. A system comprising:

an intermediary computing device to aggregate membership data from one or more payers and apply a plurality of specific rules to proactively discover and resolve COB instances to eliminate searches of multiple disparate databases and control claim resubmissions and inappropriate claim submissions, the intermediary computing device including a memory storage and a hardware processing unit coupled to the memory storage operable to:

receive, in real time, a membership file comprising payer data including eligibility and member demographic data;
normalize the received payer data into a format that increases a likelihood of discovering matching information according to the received payer data;
compare the normalized payer data with payer data received from one or more other payers to determine if any information is previously unmatched according to the plurality of specific rules;
apply the plurality of specific rules to discover matching or partially-matching payer data to automatically resolve COB instances when an individual is covered under multiple healthcare insurance coverages, wherein to discover the matching or partially-matching payer data includes application of the plurality of specific rules that include:

a first rule for a name match requiring normalized first and last names to match exactly;
a second rule for a partial last name match requiring a normalized first name to match exactly and matching of a first number of characters of a normalized last name;
a third rule for a partial first name match requiring a normalized last name to match exactly and matching of a first number of characters of a normalized first name;
a fourth rule for an equivalent first name match requiring a normalized last name to match exactly and matching of a normalized first name according to a first name synonym table that includes matching of a synonym first name associated with the normalized first name;
a fifth rule for an address match requiring a normalized street address to match exactly and matching of either a city name or a zip code;
a sixth rule for a first date of birth match requiring a first number of digits of a date of birth to match in the same relative position;
a seventh rule for a first social security number match requiring a first number of digits of the social security number to match in the same relative position;
an eighth rule for a second date of birth match requiring all digits of the date of birth to match in exactly the same order along with matching a phone number and a gender; and
a ninth rule for a second social security number match requiring all digits of the social security number to match in exactly the same order along with matching one or more of a last name and a first name;

after applying the plurality of specific rules, determine a primary payer and a secondary payer comprising determining primacy based on National Association of Insurance Commissioners (NAIC) and state guidelines corresponding with the discovered matching or partially matching payer data absent searching the multiple disparate databases to select a correct payer; and
store the matching or partially-matching payer data and primacy determinations in a COB database.

15. The system of claim 14, wherein the hardware processing unit is further operable to determine the primary payer and the secondary payer based on any data received that provides an exception to the National Association of Insurance Commissioners (NAIC) and state guidelines.

16. The system of claim 14, further to generate an output file that includes:
- an overview of the received payer data;
- a summary of rule matches for the plurality of rules and COB determinations; and/or
- raw data for importing into a payer system.

17. The system of claim 14, wherein to normalize the received payer data comprises determining if the received payer data includes any new, modified, or previously unmatched payer data and normalizing the any new, modified, or previously unmatched payer data.

18. A non-transitory computer readable medium containing computer executable instructions which, when executed by an intermediary computing device, aggregate membership data from one or more payers and apply a plurality of specific rules to proactively discover and resolve COB instances to eliminate searches of multiple disparate databases and control claim resubmissions and inappropriate claim submissions by:
- using the intermediary computing device as part of receiving payer data comprising at least one membership file in real time via a computer network, the membership file including eligibility and demographic data;
- using the intermediary computing device as part of normalizing the received payer data into a format that increases a likelihood of discovering matching information according to the received payer data;
- using the intermediary computing device as part of comparing the normalized payer data with payer data received from one or more other payers to determine if any information is previously unmatched according to the plurality of specific rules;
- using the intermediary computing device to apply the plurality of specific rules as part of discovering matching or partially-matching payer data to automatically resolve COB instances when an individual is covered under multiple healthcare insurance coverages, wherein the discovering the matching or partially-matching payer data includes applying the plurality of specific rules that include:
  - a first rule for a name match requiring normalized first and last names to match exactly;
  - a second rule for a partial last name match requiring a normalized first name to match exactly and matching of a first number of characters of a normalized last name;
  - a third rule for a partial first name match requiring a normalized last name to match exactly and matching of a first number of characters of a normalized first name;
  - a fourth rule for an equivalent first name match requiring a normalized last name to match exactly and matching of a normalized first name according to a first name synonym table that includes matching of a synonym first name associated with the normalized first name;
  - a fifth rule for an address match requiring a normalized street address to match exactly and matching of either a city name or a zip code;
  - a sixth rule for a first date of birth match requiring a first number of digits of a date of birth to match in the same relative position;
  - a seventh rule for a first social security number match requiring a first number of digits of the social security number to match in the same relative position;
  - an eighth rule for a second date of birth match requiring all digits of the date of birth to match in exactly the same order along with matching a phone number and a gender; and
  - a ninth rule for a second social security number match requiring all digits of the social security number to match in exactly the same order along with matching one or more of a last name and a first name;
- after applying the plurality of specific rules, using the intermediary computing device to determine a primary payer and a secondary payer comprising determining primacy based on National Association of Insurance Commissioners (NAIC) and state guidelines corresponding with the discovered matching or partially matching payer data absent searching multiple disparate databases to select a correct payer; and
- using the intermediary computing device as part of storing the matching or partially-matching payer data and primacy determinations in a COB database.

19. The non-transitory computer readable medium of claim 18, further comprising generating an output file that includes:
- an overview of the received payer data;
- a summary of rule matches for the plurality of rules and COB determinations; and/or
- raw data for importing into a payer system.

20. The non-transitory computer readable medium of claim 18, wherein normalizing the received payer data comprises determining if the received payer data includes any new, modified, or previously unmatched payer data and normalizing the any new, modified, or previously unmatched payer data.

* * * * *